United States Patent [19]

Chow et al.

[11] Patent Number: 5,935,726
[45] Date of Patent: Aug. 10, 1999

[54] METHOD AND APPARATUS FOR DISTRIBUTING WATER TO AN ION-EXCHANGE MEMBRANE IN A FUEL CELL

[75] Inventors: Clarence Y. F. Chow; John Ka Ki Chan; Adrian James Corless, all of Vancouver, Canada

[73] Assignee: Ballard Power Systems Inc., Burnaby, Canada

[21] Appl. No.: 08/980,496

[22] Filed: Dec. 1, 1997

[51] Int. Cl.⁶ ..................................................... H01M 8/00
[52] U.S. Cl. ................................ 429/13; 429/22; 429/32; 429/14; 429/17
[58] Field of Search ................................ 429/13, 22, 32, 429/14, 17

[56] References Cited

U.S. PATENT DOCUMENTS

| | | | |
|---|---|---|---|
| 3,553,023 | 1/1971 | Doyle | 136/86 |
| 4,476,197 | 10/1984 | Herceg | 429/32 |
| 4,582,765 | 4/1986 | Kothmann | 429/13 |
| 5,518,705 | 5/1996 | Buswell et al. | 429/13 |
| 5,543,238 | 8/1996 | Strasser | 429/17 |
| 5,601,936 | 2/1997 | Dudfield et al. | 429/13 |
| 5,677,073 | 10/1997 | Kawatsu | 429/22 |

FOREIGN PATENT DOCUMENTS

| | | |
|---|---|---|
| 0692835 | 1/1996 | European Pat. Off. . |
| WO 96/24958 | 8/1996 | WIPO . |

*Primary Examiner*—Bruce F. Bell
*Attorney, Agent, or Firm*—McAndrews, Held & Malloy, Ltd.

[57] ABSTRACT

A method and apparatus are provided for distributing water produced by the electrochemical reaction to an ion-exchange membrane in a electrochemical fuel cell. Water distribution within a fuel cell is improved to reduce membrane dryness near the oxidant stream inlet and to also reduce saturation of the oxidant stream near the oxidant stream outlet, thereby reducing electrode flooding. The method comprises periodically reversing the flow direction of an oxidant stream through a fuel cell flow field. The apparatus comprises an oxidant stream flow switching device for periodically switching the flow direction of an oxidant stream through a fuel cell flow field. In one embodiment the apparatus further comprises a water recycler for capturing water from the oxidant exhaust stream and returning the captured water to the oxidant supply stream when the flow direction is reversed.

24 Claims, 7 Drawing Sheets

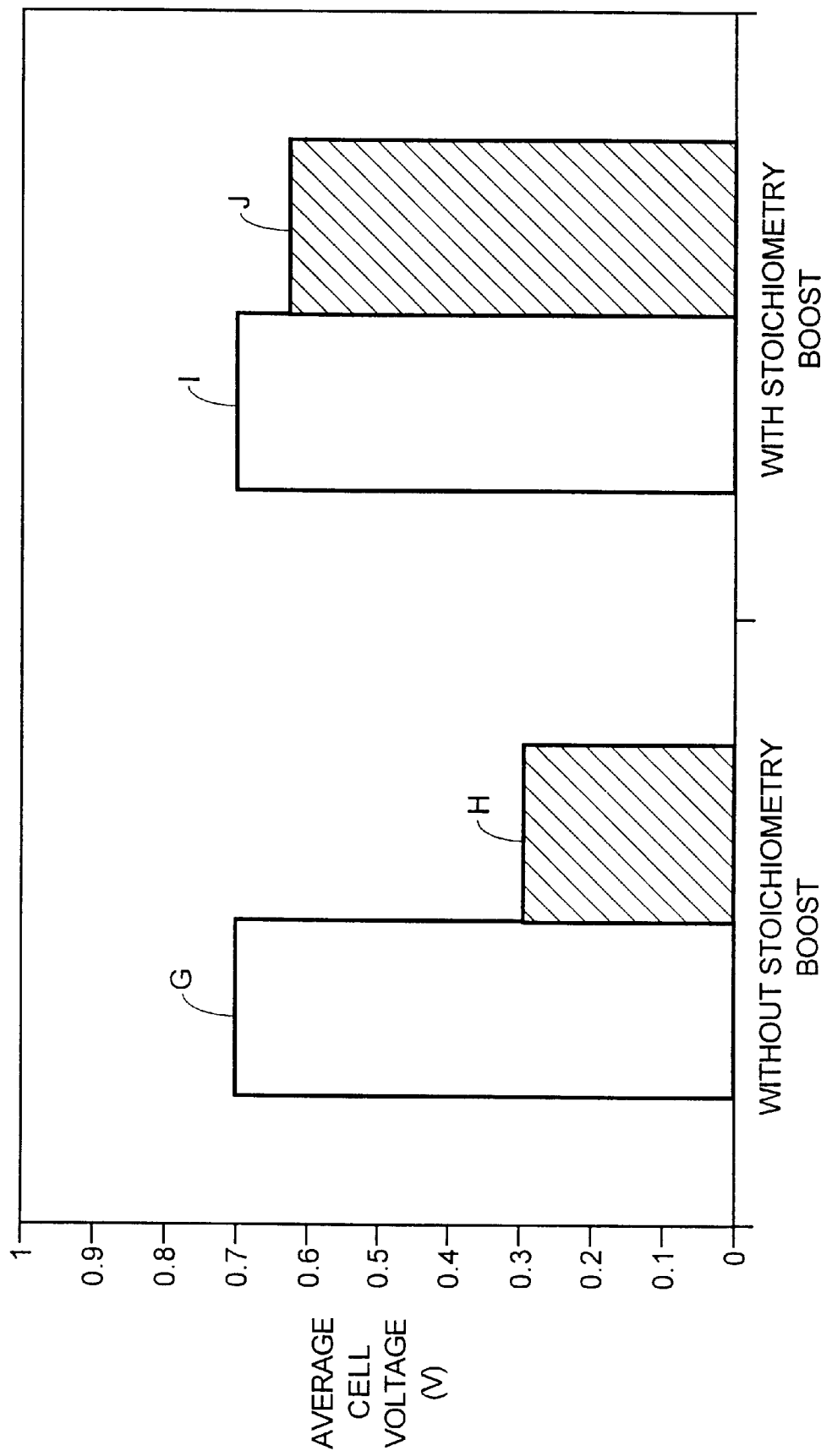

ered to enhance their ionic conductivity and reduce physical degradation resulting in structural failure and leaks. A method and apparatus are provided for utilizing water produced by the electrochemical reaction to keep the ion-exchange membrane moist. More particularly, the present invention improves water management within a fuel cell by periodically reversing the flow direction of the oxidant stream through the oxidant flow field.

METHOD AND APPARATUS FOR DISTRIBUTING WATER TO AN ION-EXCHANGE MEMBRANE IN A FUEL CELL

FIELD OF THE INVENTION

The present invention relates to solid polymer electrochemical fuel cells. Typically ion-exchange membranes in such fuel cells must be kept moist to enhance their ionic conductivity and reduce physical degradation resulting in structural failure and leaks. A method and apparatus are provided for utilizing water produced by the electrochemical reaction to keep the ion-exchange membrane moist. More particularly, the present invention improves water management within a fuel cell by periodically reversing the flow direction of the oxidant stream through the oxidant flow field.

BACKGROUND OF THE INVENTION

Electrochemical fuel cells convert fuel and oxidant fluid streams to electricity and reaction product. Solid polymer electrochemical fuel cells generally employ a membrane electrode assembly ("MEA") comprising a solid polymer electrolyte or ion-exchange membrane disposed between two porous electrically conductive electrode layers. An electrocatalyst is typically disposed at each membrane/electrode layer interface to induce the desired electrochemical reaction.

In typical fuel cells, the MEA is disposed between two electrically conductive separator plates. A fluid flow field provides a means for directing the fuel and oxidant to the respective electrocatalyst layers, specifically, at the anode on the fuel side and at the cathode on the oxidant side. A simple fluid flow field may consist of a chamber open to an adjacent porous electrode layer with a first port serving as a fluid inlet and a second port serving as a fluid outlet. The fluid flow field may be the porous electrode layer itself. More complicated fluid flow fields incorporate at least one fluid channel between the inlet and the outlet for directing the fluid stream in contact with the electrode layer or a guide barrier for controlling the flow path of the reactant through the flow field. The fluid flow field is commonly integrated with the separator plate by locating a plurality of open-faced channels on the faces of the separator plates facing the electrodes. In a single cell arrangement, separator plates are provided on each of the anode and cathode sides. The plates act as current collectors and provide structural support for the electrodes.

The fuel stream directed to the anode by the fuel flow field migrates through the porous anode and is oxidized at the anode electrocatalyst layer. The oxidant stream directed to the cathode by the oxidant flow field migrates through the porous cathode and is reduced at the cathode electrocatalyst layer.

Solid polymer fuel cells generally use fuels, such as, for example, hydrogen or methanol, which are oxidized at the anode to produce hydrogen cations. The hydrogen cations migrate through the ion-conducting electrolyte membrane and react with an oxidant such as oxygen in air at the cathode to produce water as one of the reaction products. The anode and cathode reaction equations in hydrogen/oxygen fuel cells are believed to be as follows:

Anode reaction: $H_2 \rightarrow 2H^+ + 2e^-$
Cathode reaction: $\frac{1}{2}O_2 + 2H^+ + 2e^- \rightarrow H_2O$ Water in the ion-exchange membrane facilitates the migration of protons from the anode to the cathode. The membrane is electrically non-conductive and also serves as a barrier to separate the hydrogen-containing fuel stream from the oxygen-containing oxidant stream.

The electrons produced at the anode induce an electrical current through an external circuit or load from the anode to the cathode.

Because water is produced by the cathode reaction, as the oxidant stream travels through the oxidant flow field, the oxidant stream absorbs product water. The product water is absorbed as water vapor until the oxidant stream becomes saturated; additional product water may be carried in the oxidant stream as entrained water droplets.

The cumulative effect of product water absorption into the oxidant stream causes the flow field region near the oxidant flow field outlet to contain more water than the flow field region closer to the oxidant stream inlet. Therefore, the fresh oxidant supply stream typically enters the oxidant flow field at its driest region. If the oxidant supply stream entering the oxidant flow field is not adequately humidified, the oxidant stream may absorb water from the membrane in the region nearest the oxidant stream inlet.

It is generally well known that most conventional fuel cell ion-exchange membranes must be kept moist to maintain adequate ionic conductivity and to reduce structural damage which may result if the membrane is allowed to become too dry. It is known that leaks in membranes frequently occur near reactant stream inlet ports. Such leaks may be caused or contributed to by inlet streams drying the membrane, resulting in the formation of cracks or holes.

Accordingly, in the prior art, it is known to provide means for keeping the membrane wet and/or humidifying the reactant streams before they enter the flow fields. A disadvantage of conventional methods of humidifying the reactant streams is that incorporating an external humidification apparatus adds to the system complexity and reduces the overall system efficiency.

The production of water at the cathode may cause another problem if too much water accumulates in the oxidant flow field. If the oxidant stream becomes saturated, two phase flow may occur, that is, the oxidant stream may contain water vapor and liquid water droplets. Liquid water in the oxidant flow field can "flood" the porous electrode and obstruct the oxidant from reaching the cathode electrocatalyst. Saturation and flooding is more likely to occur in the portions of the oxidant flow field closest to the outlet, where the oxidant stream has had the most opportunity to accumulate product water.

In view of the above-identified problems, overly wet or dry regions of the flow field can detrimentally affect fuel cell performance and accelerate the degradation of performance over time. Fuel cell performance is defined as the voltage output from the cell for a given current density; higher performance is associated with higher voltage for a given current density. Accordingly, there is a problem with conventional fuel cells which have localized wet and dry regions caused by the cumulative effect of reaction product water absorption into the oxidant stream.

Two or more fuel cells can be connected together, generally in series but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack, and is typically held together in its assembled state by tie rods and end plates.

As with single cell fuel cell assemblies, in a fuel cell stack where fixed inlets and outlets are typically used for supplying and exhausting reactants, the accumulation of product water in the oxidant flow fields causes similar localized wet and dry conditions in each individual fuel cell of the stack. Consequently, at the inlets near the stack oxidant supply manifolds, the membranes can become overly dry, while the oxidant stream can become saturated near the outlets to the stack oxidant exhaust manifolds.

Accordingly, it is an object of the present invention to provide a method and apparatus for managing product water and distributing water to an ion-exchange membrane in an electrochemical fuel cell, while reducing the above-identified problems caused by localized conditions found in conventional fuel cells and fuel cell stacks.

SUMMARY OF THE INVENTION

In the present method, water accumulating in an oxidant stream in an oxidant flow field of a solid polymer electrochemical fuel cell flow field is utilized to provide moisture to the ion-exchange membrane. The method comprises periodically reversing the direction of flow of an oxidant stream in an oxidant flow field of a solid polymer fuel cell. The oxidant flow field ports alternate in function, periodically and oppositely acting as oxidant stream inlets and oxidant stream outlets.

In a preferred embodiment of the method, the fuel stream flowing through the fuel flow field is directed from a fuel stream inlet to a fuel stream outlet in a constant direction. Maintaining a constant fuel stream flow direction reduces the fluctuations in voltage output which may be increased if the flow directions of both fuel and oxidant stream are reversed. (Such voltage fluctuations are less significant when substantially pure, rather than dilute, reactant streams are used.) Also, additional apparatus for reversing fuel stream flow direction is not required.

Despite the above-identified advantages to maintaining a constant fuel stream flow direction, there may be benefits in also reversing the fuel stream flow direction. For example, reversing the fuel stream flow direction helps to reduce localized conditions at the anode, and gives similar benefits to those obtained with periodic oxidant stream flow reversal, which are described in more detail herein. Accordingly, another embodiment of the method further comprises periodically reversing the fuel stream flow direction. Reversal of the flow direction of the fuel stream need not be synchronized with the reversal of the direction of the oxidant stream. The fuel and oxidant flow directions may be arranged in a cross-flow arrangement. However, when the oxidant and fuel flow field ports are substantially aligned, the fuel and oxidant flow directions are controlled to prevent concurrent flow. This avoids accelerated drying of the membrane which may be caused by both reactant streams initially contacting the membrane in the same region, as may be the case with concurrent flow. Accordingly, a controller is employed to operate the fuel and oxidant flow switching devices to prevent the fuel and oxidant streams from flowing in the same direction between their respective inlet and outlet flow field ports.

The method may further comprise releasably capturing water from the oxidant stream downstream of the oxidant flow field and releasing at least a portion of the captured water into the oxidant stream upstream of the oxidant flow field when the flow direction is reversed.

The method may further comprise momentarily raising the stoichiometry of the oxidant stream immediately prior to reversing the oxidant stream flow direction. Oxidant stoichiometry is the ratio of oxidant supplied to the fuel cell to the oxidant consumed in the fuel cell. Increasing oxidant stoichiometry generally enhances fuel cell performance.

The method may be applied to a single fuel cell or to a plurality of fuel cells assembled in a fuel cell stack. In a stack, the flow direction of an oxidant stream through individual fuel cells of the stack may be reversed simultaneously or in a staggered or sequential fashion.

Periodically reversing the fuel stream flow direction, while maintaining a constant oxidant fuel stream flow direction, may offer some advantages over conventional operation, but is generally less preferable to methods comprising periodic reversal of the oxidant stream flow direction. Performance benefits resulting from improved water management are generally greater at the cathode, where product water is generated and tends to accumulate. However, improved water management at the anode may result in enhanced performance and ability to operate at lower fuel stoichiometries. Also, periodic fuel stream flow direction reversal may reduce or eliminate the need for fuel stream pre-humidification; this is more important for substantially pure fuel streams, such as hydrogen, than for reformate fuel streams which typically contain residual water from a steam reforming process. In a method comprising periodically reversing the fuel stream flow direction, while maintaining a constant oxidant fuel stream flow direction, preferably a substantially pure fuel stream is used. As mentioned above, this reduces voltage fluctuations associated with fuel stream flow direction switching. The method may further comprise releasably capturing water from the fuel stream downstream of the fuel flow field and releasing at least a portion of the captured water into the fuel stream upstream of the fuel flow field when the flow direction is reversed.

In any of the above embodiments, periodic flow reversal of either or both reactant streams may optionally be combined with recirculation of either or both reactant streams through the fuel cell.

In one embodiment of an apparatus, an electrochemical fuel cell assembly comprises an ion-exchange membrane interposed between a cathode and an anode, and the fuel cell assembly further comprises:

(a) an oxidant flow field associated with the cathode for directing an oxidant supply stream to the cathode between a first oxidant flow field port and a second oxidant flow field port;

(b) a fuel flow field associated with the anode for directing a fuel stream to the anode between a fuel stream inlet port and a fuel stream outlet port; and (c) an oxidant stream flow switching device for periodically reversing the direction of flow of the oxidant supply stream between the first oxidant flow field port and the second oxidant flow field port without synchronously reversing said fuel stream flow direction through said fuel flow field.

The oxidant flow field directs the oxidant stream to the cathode. While the fresh oxidant is introduced to the oxidant flow field through the first oxidant flow field port, the depleted oxidant is exhausted through the second oxidant flow field port. When the oxidant stream flow switching device is actuated, the functions of the first and second oxidant flow field ports are exchanged.

The oxidant flow field may comprise channels or barriers for directing the flow path of the oxidant across the area of the cathode surface. In a preferred embodiment, the oxidant flow field comprises at least one continuous channel extending between the first oxidant flow field port and the second oxidant flow field port. Preferably the oxidant flow path is substantially symmetrical between the oxidant flow field ports to provide essentially the same flow path characteristics irrespective of oxidant stream flow direction.

The oxidant stream flow switching device preferably comprises two discrete settings, namely, a first setting for directing the oxidant supply stream to the first oxidant flow field port and the oxidant exhaust stream through the second oxidant flow field port; and, a second setting for directing the oxidant supply stream to the second oxidant flow field port and the oxidant exhaust stream through the first oxidant flow field port. Where there are a plurality of fuel cell stacks all served by a single oxidant stream flow switching device, the device may have more than two settings so that the oxidant stream flow direction in one stack may be reversed independently from the other stacks.

The oxidant stream flow switching device comprises an controller for periodically switching the device between the first and second settings to reverse the oxidant stream flow direction in the oxidant flow field. The controller may be manually actuated, but is preferably automatically actuated. For example, the controller may reverse the oxidant stream flow direction at pre-selected regular time intervals, or the controller may adjust the frequency with which the flow direction is reversed in response to some measured instantaneous operational parameter or condition, for example power output or performance of the fuel cell, moisture content in the membrane electrode assembly, temperature, reactant stream pressure, reactant stream humidity, or reactant mass flow rate.

For example, in a preferred embodiment the controller preferentially actuates the oxidant stream flow switching device when fuel cell power output is less than a threshold value, but not more or less frequently that at a pre-determined frequency.

In one embodiment, the apparatus may further comprise a water recycler positioned in the oxidant flow stream between the oxidant stream flow switching device and each of the first and second oxidant flow field ports. The water recycler releasably captures water from the wet oxidant exhaust stream. When the oxidant stream flow direction reverses, the water recycler releases at least a portion of the captured water to the drier oxidant stream upstream of the oxidant flow field. The water recycler may employ any device which will separate water vapor and/or entrained water droplets from a gaseous stream and impart water vapor to a gaseous stream. Preferably, the water recycler is passive and does not require external energy to operate.

In a preferred embodiment, the water recycler comprises porous hygroscopic media positioned in the oxidant stream which adsorbs water as the wet oxidant exhaust stream passes in contact with the media.

The water recycler may further comprise a means for receiving water from a reservoir external to the fuel cell when the water recyclers have insufficient water for humidification of the oxidant supply stream.

BRIEF DESCRIPTION OF THE DRAWINGS

FIG. 6 is a bar graph showing data obtained for a fuel cell stack operating with periodic oxidant stream flow direction reversal, without pre-humidification of the oxidant stream. The average fuel cell voltage and the average minimum voltage which occurred momentarily during each oxidant stream flow reversal, without and without a boost in oxidant stoichiometry, are shown.

DETAILED DESCRIPTION OF THE PREFERRED EMBODIMENTS

Figure 1:
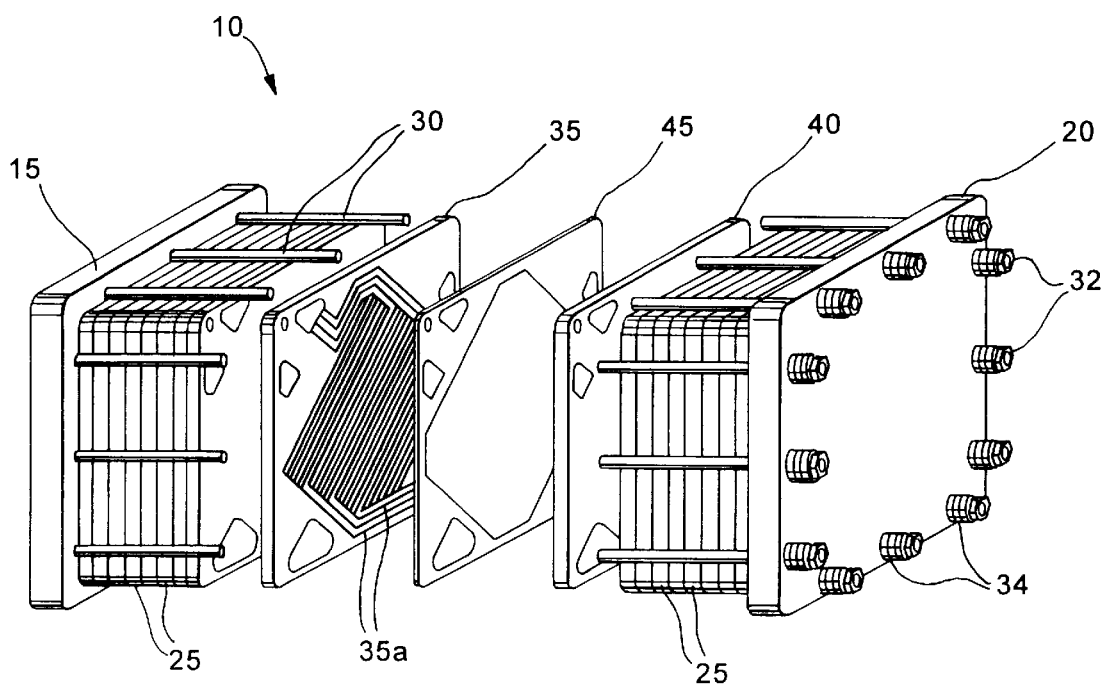
FIG. 1 is an exploded view of a conventional solid polymer electrochemical fuel cell stack.

FIG. 1 illustrates, in exploded view, a conventional (prior art) solid polymer electrochemical fuel cell stack 10, including a pair of end plate assemblies 15, 20 and a plurality of fuel cell assemblies 25. Tie rods 30 extend between end plate assemblies 15 and 20 to retain and secure stack assembly 10 in its assembled state with fastening nuts 32. Springs 34 threaded on the tie rods 30 interposed between the fastening nuts 32 and the end plate 20 apply resilient compressive force to the stack in the longitudinal direction. Reactant and coolant fluid streams are supplied to and exhausted from internal manifolds and passages in the stack 10 via stack inlet and outlet ports (not shown) in end plate 15. As shown by the exploded portion of FIG. 1, each fuel cell assembly 25 includes an anode flow field plate 35, a cathode flow field plate 40, and a membrane electrode assembly 45 interposed between plates 35 and 40. Membrane electrode assembly 45 comprises an ion-exchange membrane interposed between an anode and a cathode. Plate 35 has a plurality of fluid flow channels 35a formed in its major surface facing membrane electrode assembly 45 for directing a reactant stream in contact with one of the electrodes of membrane electrode assembly 45.

Figure 2A:
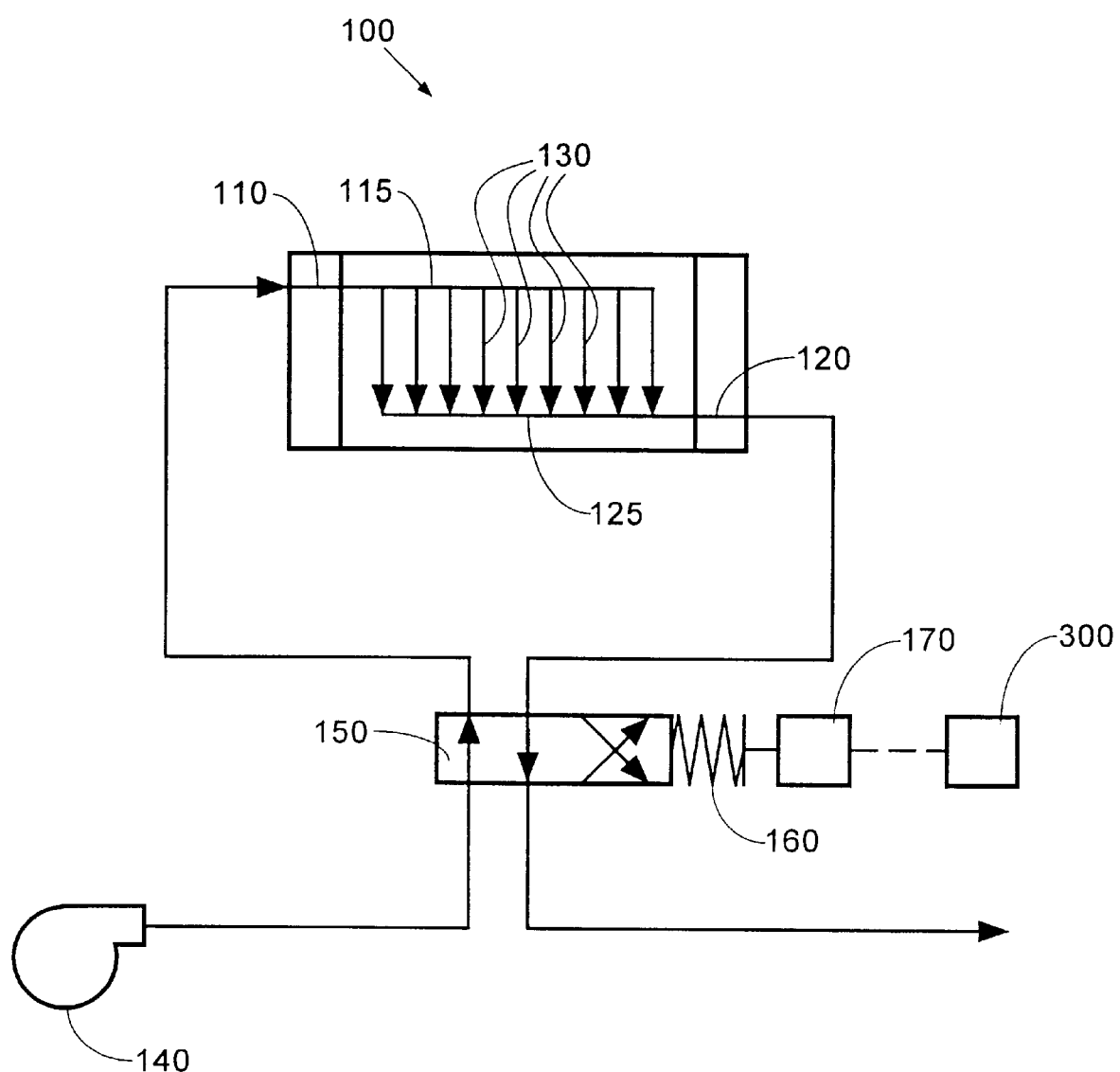
FIGS. 2a and 2b are schematic diagrams of an embodiment of an electrochemical fuel cell assembly comprising an oxidant stream flow switching device for reversing the flow direction of the oxidant stream through a fuel cell stack.
Figure 2B:
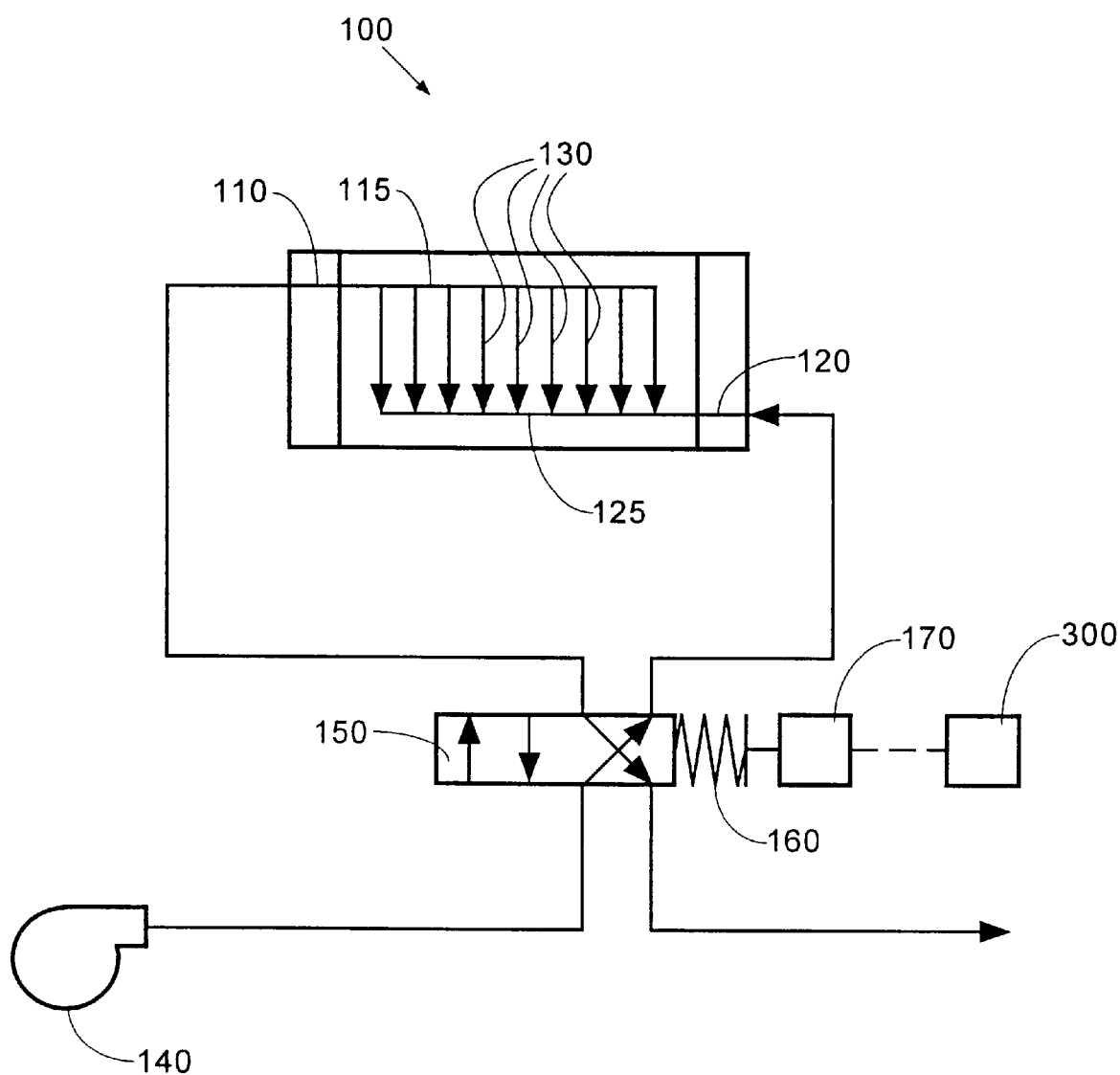

FIGS. 2a and 2b schematically depict an embodiment of the invention. A fuel cell stack 100 has two oxidant stream ports 110, 120 and associated manifolds 115, 125 for supplying and exhausting an oxidant stream to and from individual fuel cells in stack 100. Lines 130 represent the individual fuel cell oxidant flow fields through which the oxidant stream is directed to the cathodes. In the illustrated embodiment, the oxidant flow fields of individual fuel cells of the stack are manifolded in parallel; however, some or all of them may be manifolded in series. Stack 100 also has ports, and manifolds (not shown) for supplying and exhausting a fuel stream to and from fuel flow fields of stack 100.

In FIG. 2a, port 110 acts as the oxidant stream inlet and manifold 115 supplies oxidant stream to flow fields 130. Port 120 acts as the outlet for exhausting an oxidant stream from flow fields 130 and manifold 125.

Compressor 140 supplies an oxidant stream (such as air) to stack 100 via an oxidant stream flow switching device 150. Oxidant stream flow switching device 150 controls the directional flow of an oxidant stream through stack 100 by controlling which one of ports 110, 120 acts as the oxidant stream inlet for flow fields 130.

In FIG. 2a, oxidant stream flow switching device 150 is set to direct the oxidant supply stream via port 110 and exhaust the oxidant stream from the fuel cells through port 120. In FIG. 2b, oxidant stream flow switching device 150 is set so that port 120 acts as the oxidant stream inlet, and port 110 acts as the oxidant stream outlet. The arrows on lines 130, represent the direction of oxidant stream flow through the individual fuel cell oxidant flow fields. Accordingly, the arrows on lines 130 indicate that the oxidant stream flow direction through the fuel cell oxidant flow fields has reversed from FIG. 2a to FIG. 2b.

In FIGS. 2a and 2b, oxidant stream flow switching device 150 is represented by a single component. However, as will be appreciated by those skilled in the art, oxidant stream flow switching device 150 may be any device or combination or assembly of components capable of reversing the direction of fluid flow through the oxidant flow fields 130. For example, the oxidant stream flow switching device 150 may comprise various valves cooperatively operated.

Figure 3:
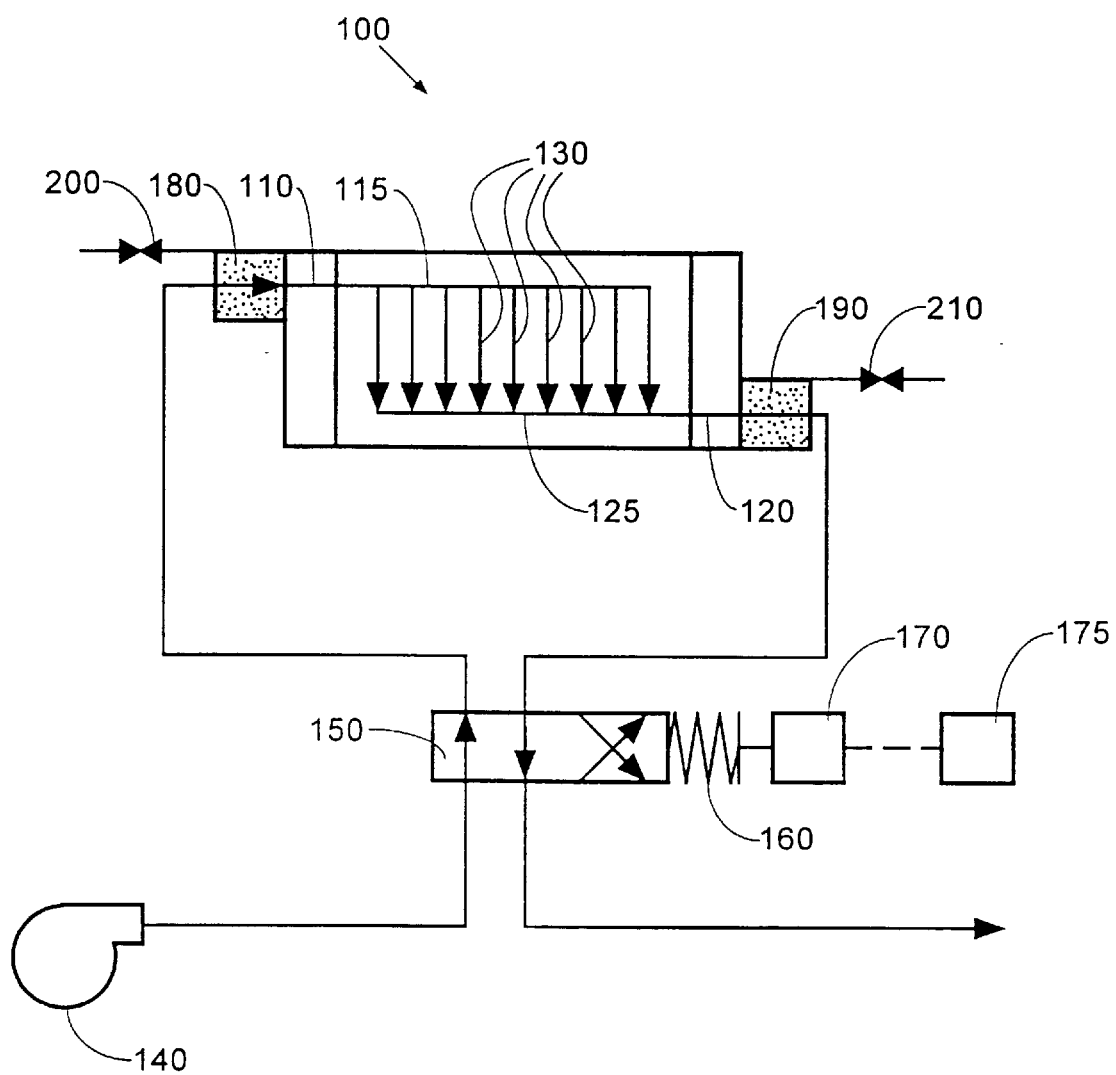
FIG. 3 is a schematic diagram of the embodiment of FIGS. 2a and 2b, further comprising means for reversibly trapping water from the oxidant stream.

In FIGS. 2a, 2b and 3, oxidant stream flow switching device 150 is schematically depicted as a device with a sliding motion for selecting a setting for controlling the oxidant stream flow direction. Any known type of flow switching device or apparatus can be used, for example, one that uses a rotary motion or a pivoting motion.

In FIGS. 2a, 2b and 3, mechanism 160 which actuates oxidant stream flow switching device 150 is schematically depicted as a coil spring, compressed in FIG. 2a and FIG. 3, and released in FIG. 2b. Mechanism 160 can be any type of actuator known in the prior art such as a mechanical actuator, electrical actuator, electro-magnetic actuator, pneumatic actuator, hydraulic actuator, or hybrid actuator which combines different types of actuators for movements in different directions.

In the illustrated embodiment, mechanism 160 is part of a controller 170 which periodically causes mechanism 160 to change the setting of oxidant stream flow switching device 150. The preferred frequency or time interval with which the flow is reversed by actuating the actuator will vary according to the characteristics of the particular fuel cell, and its operating condition.

For example, characteristics which may affect the preferred frequency include: the size and configuration of the fuel cell oxidant flow fields and membrane, the nature of the ion-exchange membrane, the electrode structure, the type of fuel and oxidant streams being used, and the humidity of the oxidant supply stream.

Preferably, controller 170 causes the oxidant stream flow direction to reverse before the membrane becomes dry near the oxidant stream inlet portion of each flow field, and before saturation of the oxidant stream and electrode flooding significantly degrade fuel cell performance.

In one embodiment, shown in FIG. 3, controller 170 uses a timer 175 which is set to cause oxidant stream flow direction to reverse at regular time intervals, for example, determined empirically for a given fuel cell. Timer 175 can be set to only take into account elapsed time while the fuel cell is producing electrical power or when compressor 140 is operating.

In a more sophisticated embodiment, a computer 300 is used in conjunction with controller 170 (see FIGS. 2a and 2b). The computer receives data respecting several factors which are used to select a time for actuating oxidant stream flow switching device 150. For example computer 300 may be programmed to cause the oxidant stream flow direction to reverse at particular pre-determined intervals or in response to some measured operational parameter or condition, for example, power output or performance of the fuel cell, moisture content in the membrane electrode assembly, temperature, reactant stream pressure, reactant stream humidity, or reactant mass flow rate.

FIG. 3 is a schematic diagram of an embodiment further comprising water recyclers 180, 190 for reversibly capturing water from the exhaust oxidant stream and humidifying the supply oxidant stream before it enters stack 100. Water recyclers 180, 190 can be any device which will separate water vapor and/or entrained water droplets from a gaseous stream and impart water vapor to a gaseous stream. Water recyclers 180, 190 are positioned between ports 110, 120 respectively, and the oxidant stream flow switching device 150, so that water is removed from the oxidant exhaust stream when one of ports 110, 120 is associated with the flow field outlet. When one of ports 110, 120 is associated with the oxidant stream inlet, respective water recycler 180, 190 releases the captured water to humidify the oxidant supply stream.

In one embodiment, water recyclers 180, 190 comprise porous hygroscopic media. The porous hygroscopic media is positioned so that the oxidant exhaust stream is directed through the media. The media captures water from the humid exhaust oxidant stream. Depending upon the length of the time intervals between reversals in oxidant stream flow direction, the media will become partly or completely saturated. If the media becomes saturated, then some of the product water will be exhausted from the fuel cell with the oxidant exhaust stream. When the oxidant stream flow direction reverses, the oxidant supply stream is humidified by absorbing water from the media when it passes therethrough.

It is preferred to use media with a high affinity for water to reduce the size of water recyclers 180, 190. Many materials are known to be hygroscopic and some of these materials are widely known as being effective for removing water from air. Examples of such materials are adsorbent materials such as: silica gels, and zeolites such as activated carbon or molecular sieves which have high surface areas for collecting water.

It will be apparent to those skilled in the art that a variety of other devices may be used as water recyclers 180, 190. For example, water recyclers 180, 190 may incorporate a cooler to condense water vapor from the exhaust stream, and a vaporizer to re-introduce the condensed water into the oxidant supply stream.

With reference to FIG. 3, water may be provided to water recyclers 180, 190 via valves 200, 210, if there is insufficient water produced by the electrochemical reaction. For example, when the fuel cell is being started up, there may not be any captured product water in water recyclers 180, 190. If water recyclers 180, 190 comprise a dry hygroscopic media, the media may adsorb water from the oxidant supply stream, with detrimental effects to the membrane near the oxidant stream inlet.

The fuel stream flow path in FIGS. 2a, 2b and 3 is not shown, but could be illustrated schematically in the same manner as the oxidant stream flow path is depicted with, or in preferred embodiments without, a fuel stream flow switching device. If a fuel stream flow switching device is used, the apparatus preferably further comprises one or more water recyclers for reversibly capturing water from the exhaust fuel stream and humidifying the supply fuel stream before it enters the stack.

Figure 4:
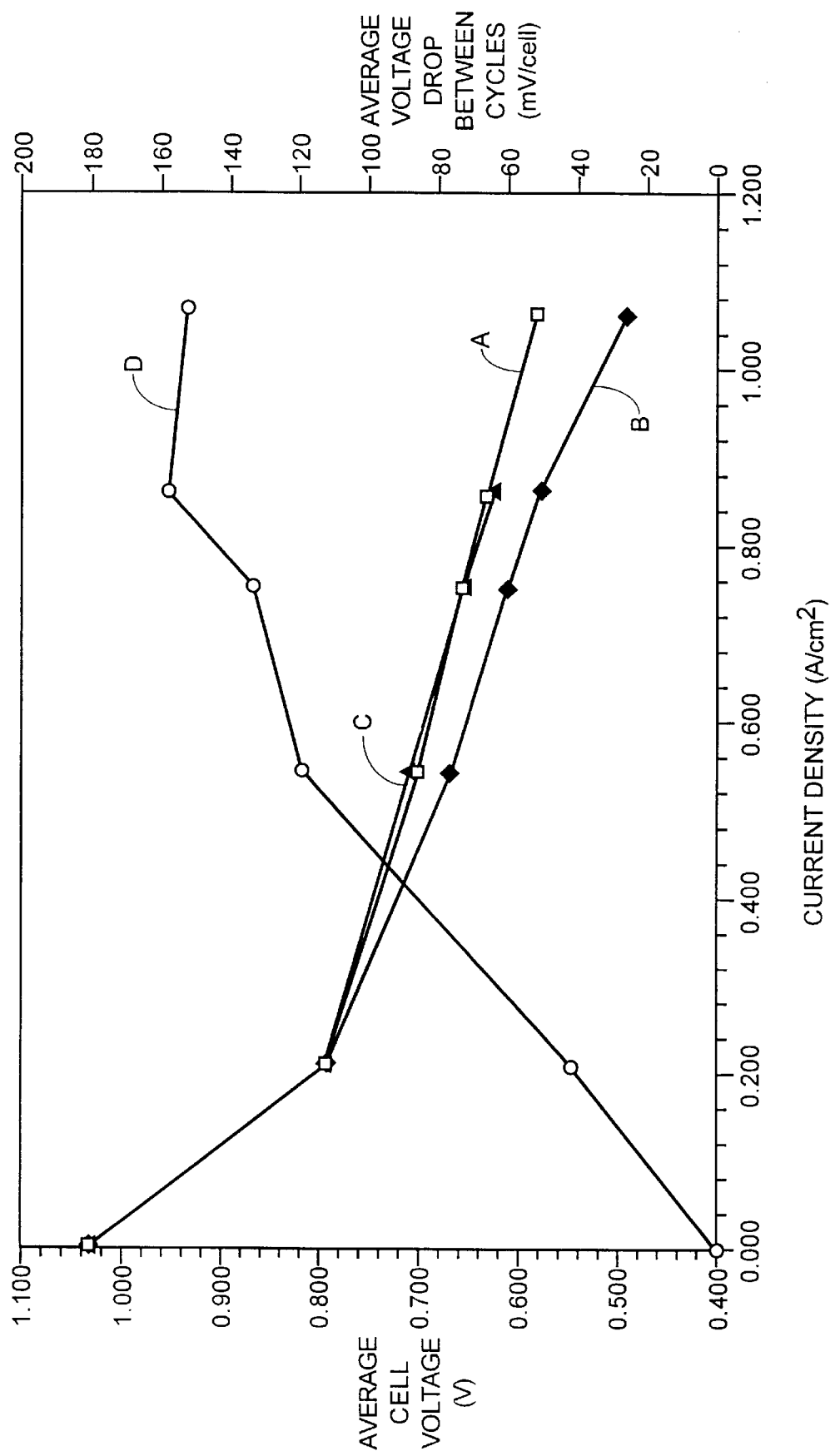
FIG. 4 is a composite graph which shows comparative fuel cell performance data for a fuel cell stack operating with and without periodic oxidant stream flow direction reversal, without and with pre-humidification of the oxidant stream, respectively.

FIG. 4 shows comparative data in the form of polarization plots obtained using a Ballard Mark 700 10-cell fuel cell stack, operating on substantially pure hydrogen as the fuel, and with the following operating conditions:

inlet fuel stream pressure: 30 psig:
inlet oxidant stream pressure: 30 psig;
operating temperature: 70° C. –80° C.;
inlet fuel stream relative humidity: 100% at 70° C.;
fuel stoichiometry: 1.5.

The direction of fuel stream flow in the fuel flow field remained constant between a fuel stream inlet port and a fuel stream outlet port.

Plots A through C are plots of average fuel cell voltage (left-hand y-axis) versus current density (x-axis).

Plot A shows data obtained using air as the oxidant stream, which was not pre-humidified. The oxidant stream flow direction was reversed every 30 seconds. The oxidant stoichiometry was maintained at 1.5.

Plot B shows data obtained using air as the oxidant stream, which was pre-humidified to 100% relative humidity at the inlet temperature. The oxidant flow direction was not periodically reversed and the oxidant stoichiometry was maintained at 1.5.

Plot C shows data obtained using air as the oxidant stream, which was pre-humidified to 100% relative humidity at the inlet temperature. The oxidant stream flow direction was not periodically reversed and the oxidant stoichiometry was maintained at 2.0.

Comparison of plots A and B in FIG. 4 shows that oxidant stream flow direction switching with air which was not pre-humidified exhibited superior performance as compared with a fuel cell stack operating conventionally without flow switching with pre-humidified air (at the same stoichiometry of 1.5). Indeed, plot A which was obtained at a stoichiometry of 1.5 is comparable to plot C which was obtained conventionally without flow switching with pre-humidified air at a higher stoichiometry of 2.0. The data indicate that periodic oxidant stream flow direction reversal permits the use of oxidant streams which are not pre-humidified, and improves product water management within the fuel cells permitting the use of lower oxidant stoichiometries, both of which have significant benefits in terms of overall fuel cell system operating efficiency and system simplification.

Plot D of FIG. 4 shows the magnitude of the momentary voltage drop (right-hand y-axis) which occurred when the oxidant stream flow direction was reversed (during the acquisition of plot A). The voltage drop is larger at higher current densities (x-axis). This illustrates that, in a system in which the power output and thus current density of the fuel cell are fluctuating, it may be advantageous to reverse the flow direction during periods of lower power output.

Figure 5:
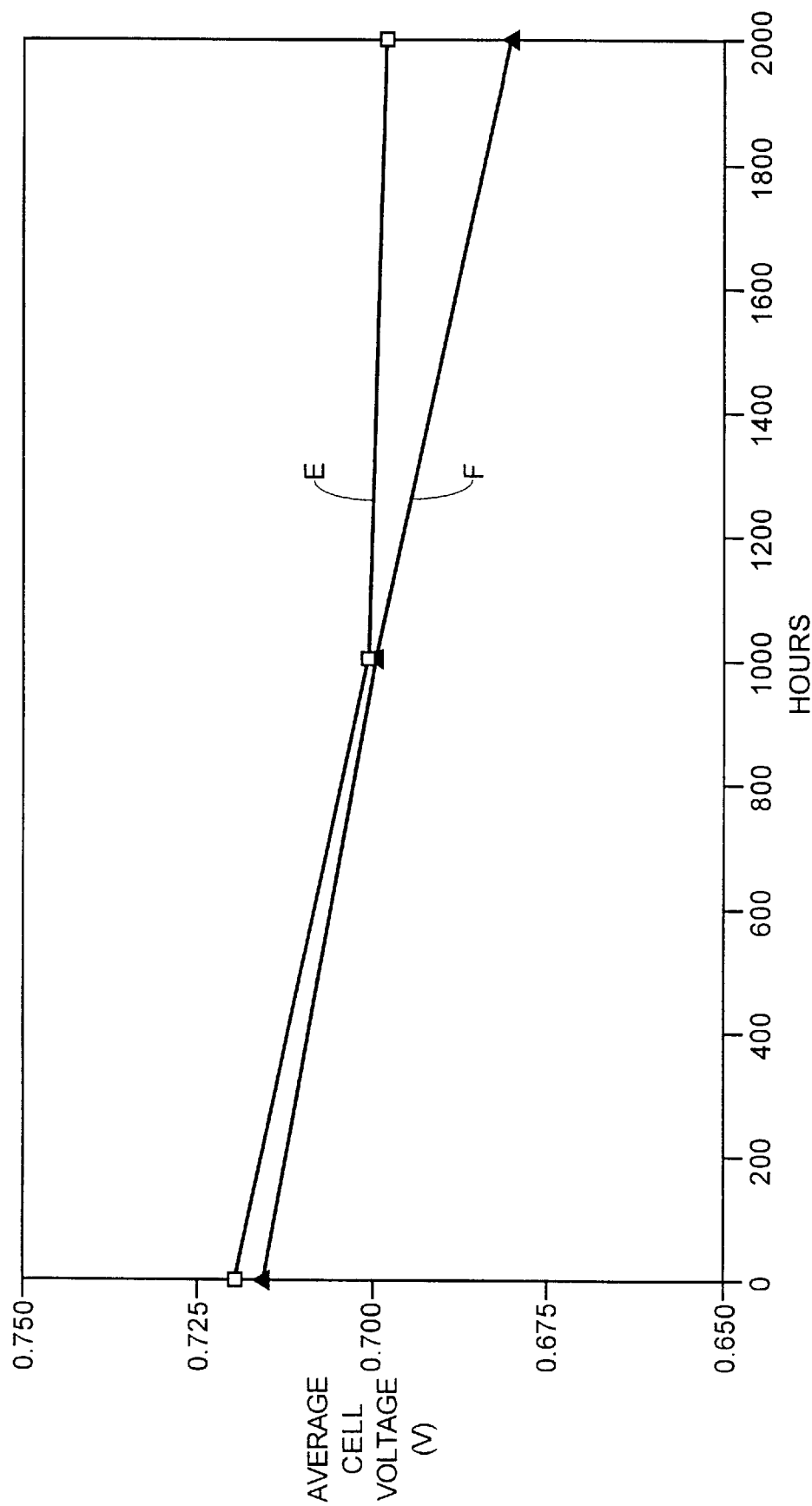
FIG. 5 shows comparative fuel cell performance data for a 2000 hour longevity test for a fuel cell stack operating with and without periodic oxidant stream flow direction reversal, without and with pre-humidification of the oxidant stream, respectively.
Figure 2B:
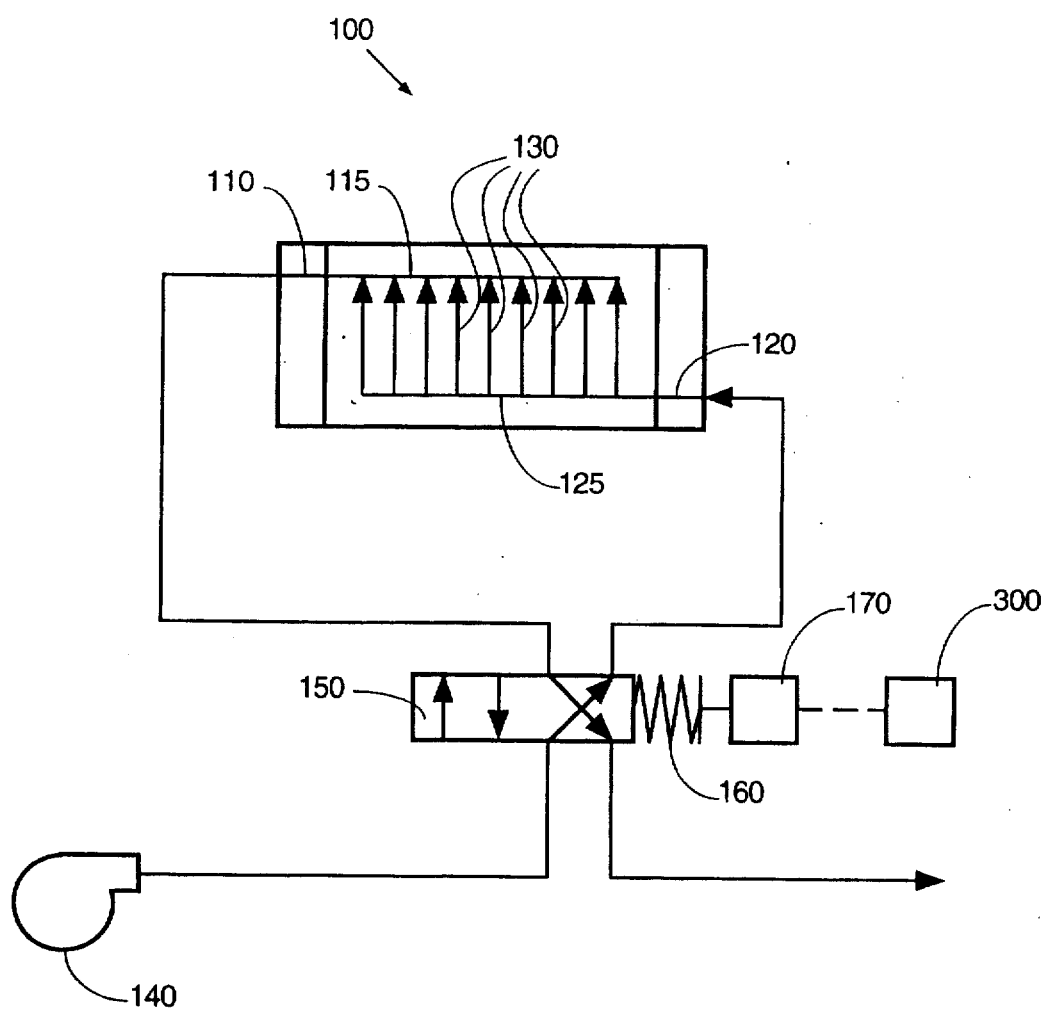

FIGS. 5 and 6 show data obtained using a Ballard Mark 800 5-cell fuel cell stack, operating on substantially pure hydrogen as the fuel, with operating conditions as follows:
inlet fuel stream pressure: 30 psig;
inlet oxidant stream pressure: 30 psig;
operating temperature: 70° C. –80° C.;
inlet fuel stream relative humidity: 100% at 70° C.;
fuel stoichiometry: 1.5.

The direction of fuel stream flow in the fuel flow field remained constant between a fuel stream inlet port and a fuel stream outlet port.

FIG. 5 shows comparative data for a 2000 hour longevity test. The average fuel cell voltage at a current density of 0.646 amperes per square centimeter ($A/cm^2$) was measured at the beginning of operation and after 1000 and 2000 hours of operation. Plot E shows data obtained using air as the oxidant stream, which was not pre-humidified. The oxidant stream flow direction was reversed every 30 seconds, and the oxidant stoichiometry was 1.5. Plot F shows data obtained using air as the oxidant stream, pre-humidified to 80% humidity at the inlet temperature. The oxidant stream flow direction was not periodically reversed. A higher oxidant stoichiometry of 2.0 was used.

The data indicate that operating the fuel cell stack with periodic oxidant stream flow direction reversal and no pre-humidification of the oxidant air gives less degradation in fuel cell performance over time compared with conventional operation on humidified air at a higher stoichiometry without periodic flow reversal.

FIG. 6 shows the average fuel cell voltage at a current density of 0.646 $A/cm^2$ for a stack operating on air as the oxidant stream, which was not pre-humidified. The oxidant stream flow direction was reversed every 30 seconds. In one test the oxidant stoichiometry was maintained at 1.5—plot G of the bar chart shows the average cell voltage and plot H shows the average minimum voltage which occurred momentarily at the moment of flow reversal during this test. In a second test the oxidant stream flow stoichiometry was boosted from 1.5 to 2.5 for a duration of approximately 1 second commencing approximately 0.2 seconds prior to each oxidant stream flow direction reversal—plot I of the bar chart shows the average cell voltage and plot J shows the average minimum voltage which occurred momentarily during the flow reversal during this test. Plot J shows that a momentary boost in stoichiometry from 1.5 to 2.5 was effective in reducing the amount of voltage decay occurring at the moment of oxidant stream flow reversal.

Accordingly, the apparatus may comprise a device for momentarily raising the stoichiometry of the oxidant stream before the oxidant flow direction is reversed. This momentary pressure boost may alleviate brief decreases in the power output of the fuel cell which may otherwise occur when the oxidant stream flow direction is reversed. For example, if the fuel cell is operated using a dilute oxidant stream, such as air, when the oxidant stream flow direction is reversed the fuel cells will be momentarily supplied with oxidant stream in which the concentration of reactant (oxygen in the case of air) is depleted. This depleted oxidant stream occupies the volume between the oxidant flow field and oxidant stream flow switching device 150. This may result in a momentary decay in power output. It is believed that a pressure boost may help to provide adequate oxidant supply to the fuel cell cathodes during the oxidant flow reversal. The preferred precise timing and duration of such momentary increases in stoichiometry will vary depending on factors such as the volume of the fuel cell flow fields and the volume occupied by the oxidant stream between oxidant flow field and the oxidant stream flow switching device. If the fuel stream flow direction is being periodically reversed, a similar advantage may be realized by momentarily increasing the fuel stoichiometry.

To reduce the effects of transient conditions during oxidant stream flow direction reversal (especially when using a dilute oxidant stream), it is beneficial to reduce the volume occupied by the oxidant stream between the oxidant stream flow switching device 150 and the flow field ports. By positioning the oxidant stream flow switching device 150 closer to the flow field ports (for example, in the fuel cell stack end plates) less oxidant exhaust is recirculated to the oxidant flow field when the oxidant stream flow direction reverses which helps to reduce fluctuations in power output.

The described method can be applied to an individual fuel cell, a fuel cell stack or a plurality of fuel cell stacks. In a stack, the flow direction of an oxidant stream through individual fuel cells of the stack may be reversed simultaneously or in a staggered or sequential fashion. Similarly, in a power plant comprising a plurality of fuel cell stacks, the oxidant stream flow reversals through each stack may occur simultaneously or may be staggered. For example, it may be advantageous if the oxidant stream flow reversals for each stack are sequenced so that no two stacks are experiencing oxidant stream flow reversal at the same moment. Sequencing the oxidant stream flow reversals helps to reduce fluctuations in power output which are associated with reversing the oxidant stream flow direction.

Several advantages may be realized by implementing the present method and/or apparatus, including the following:

- ability to reduce oxidant and/or fuel stoichiometry at a given performance level because of improved product water management within the fuel cell;
- reduction in parasitic loads because of reductions in reactant flow requirements;
- the apparatus may simplify fuel cell system complexity by reducing or eliminating the need for humidifiers to humidify one or both reactant streams, and product water management components, including condensers, water separators, product water reservoirs, pumps, filters, and all associated piping and fittings;
- system cost and weight may be reduced by the elimination of humidifiers and product water management components;
- elimination of condensers also reduces the need for low temperature coolants which means that it may be possible to operate the cooling system at a higher temperature;
- improved operating efficiency because less power may be required to operate humidifiers or equivalent equipment; and
- apparatus for carrying out the method may be added to conventional fuel cells and stacks, without requiring disassembly or modification of the stack.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for distributing water to an ion-exchange membrane in an electrochemical fuel cell utilizing water accumulating in an oxidant stream in an oxidant flow field associated with a cathode of said fuel cell, said method comprising the step of periodically reversing the direction of flow of said oxidant stream through said oxidant flow field.

2. The method of claim 1 further comprising maintaining a constant fuel stream flow direction in a fuel flow field associated with an anode of said fuel cell, from a fuel stream inlet to a fuel stream outlet.

3. The method of claim 1 further comprising the step of periodically reversing the direction of flow of a fuel stream through a fuel flow field associated with an anode of said fuel cell, to prevent the fuel stream flow direction from being concurrent with said oxidant stream flow direction.

4. The method of claim 3 wherein said fuel stream is directed to flow in a direction substantially opposite to said oxidant stream flow direction.

5. The method of claim 1 wherein the direction of flow of said oxidant stream through said oxidant flow field is reversed at regular intervals.

6. The method of claim 1 further comprising momentarily raising the stoichiometry of said oxidant stream immediately prior to reversing the direction of flow of said oxidant stream.

7. The method of claim 1 further comprising the steps of:
   releasably capturing water from said oxidant stream downstream of said oxidant flow field; and
   releasing at least a portion of said captured water into said oxidant stream upstream of said oxidant flow field when said flow direction is reversed.

8. The method of claim 1 wherein said electrochemical fuel cell is one of a plurality of electrochemical fuel cells in a fuel cell stack and the direction of flow of said oxidant stream through each one of said plurality of fuel cells is periodically reversed.

9. A method for distributing water to an ion-exchange membrane in an electrochemical fuel cell utilizing water accumulating in a substantially pure fuel stream in a fuel flow field associated with an anode of said fuel cell, said method comprising the step of periodically reversing the direction of flow of said fuel stream through said fuel flow field.

10. The method of claim 9 wherein the direction of flow of said fuel stream through said fuel flow field is reversed at regular intervals.

11. The method of claim 9 further comprising the steps of:
    releasably capturing water from said fuel stream downstream of said fuel flow field; and
    releasing at least a portion of said captured water into said fuel stream upstream of said fuel flow field when said flow direction is reversed.

12. An electrochemical fuel cell assembly comprising an ion-exchange membrane interposed between a cathode and an anode, said assembly further comprising:
    an oxidant flow field associated with said cathode for directing an oxidant supply stream to said cathode between a first oxidant flow field port and a second oxidant flow field port;
    a fuel flow field associated with said anode for directing a fuel supply stream to said anode between a fuel stream inlet port and a fuel stream outlet port; and
    an oxidant stream flow switching device for periodically reversing the direction of flow of said oxidant supply stream between said first and second oxidant flow field ports without synchronously reversing said fuel supply stream flow direction.

13. The electrochemical fuel cell assembly of claim 12 wherein said oxidant flow field flow is substantially symmetrical between said first and second oxidant flow field ports.

14. The electrochemical fuel cell assembly of claim 12 wherein said oxidant stream flow switching device is operable between first and second settings wherein said first setting directs an oxidant supply stream to said first oxidant flow field port and an oxidant exhaust stream through said second oxidant flow field port, and said second setting directs said oxidant supply stream to said second oxidant flow field port and said oxidant exhaust stream through said first oxidant flow field port.

15. The electrochemical fuel cell assembly of claim 14 further comprising a controller for periodically switching said oxidant stream flow switching device between said first and second settings such that directional flow through said oxidant flow field periodically reverses.

16. The electrochemical fuel cell assembly of claim 15 wherein said controller is manually actuated.

17. The electrochemical fuel cell assembly of claim 15 wherein said controller is automatically actuated.

18. The electrochemical fuel cell assembly of claim 17 wherein said controller is adjustable to vary the frequency with which said oxidant stream flow direction is reversed.

19. The electrochemical fuel cell assembly of claim 18 wherein said controller adjusts said frequency responsive to a measured operational parameter of said fuel cell.

20. The electrochemical fuel cell assembly of claim 19 wherein said controller adjusts said frequency responsive to an electrical output of said fuel cell.

21. The electrical fuel cell assembly of claim 20 wherein said controller actuates said oxidant stream flow switching device when the power output of said fuel cell is below a threshold value.

22. The electrochemical fuel cell assembly of claim 12 further comprising a water recycler positioned between said oxidant stream flow switching device and each of said first and second oxidant flow field ports for releasably capturing water from said oxidant exhaust stream and releasing at least a portion of said captured water into said oxidant supply stream upstream of said oxidant flow field when said flow direction is reversed.

23. The electrochemical fuel cell assembly of claim 22 wherein said water recycler comprises hygroscopic media.

24. An electrochemical fuel cell assembly comprising an ion-exchange membrane interposed between a cathode and an anode, said assembly further comprising:

an oxidant flow field associated with said cathode for directing an oxidant supply stream to said cathode between a first oxidant flow field port and a second oxidant flow field port;

a fuel flow field associated with said anode for directing a fuel supply stream to said anode between a first fuel flow field port and a second fuel flow field port;

an oxidant stream flow switching device for reversing the direction of flow of said oxidant supply stream between said first and second oxidant flow field ports;

a fuel stream flow switching device for reversing the direction of flow of said fuel supply stream between said first and second fuel flow field ports; and a controller for periodically operating said oxidant stream flow switching device and said fuel stream flow switching device such that said oxidant supply stream does not flow substantially concurrently with said fuel supply stream between their respective first and second flow field ports.

* * * * *

UNITED STATES PATENT AND TRADEMARK OFFICE
CERTIFICATE OF CORRECTION

PATENT NO. : 5,935,726
DATED : August 10, 1999
INVENTOR(S) : Clarence Y. F. Chow, John Ka Ki Chan and Adrian James Corless It is certified that error appears in the above-identified patent and that said Letters Patent is hereby corrected as shown below:

Drawings,
Please replace Figure 2b with the attached, corrected Figure 2b.

Signed and Sealed this

Twenty-eighth Day of May, 2002

Attest:

JAMES E. ROGAN
*Attesting Officer*  *Director of the United States Patent and Trademark Office*